C. MALLON.
CHECKING SYSTEM AND CHECK THEREFOR.
APPLICATION FILED FEB. 20, 1911.

1,015,573.

Patented Jan. 23, 1912

UNITED STATES PATENT OFFICE.

CHARLES MALLON, OF CHICAGO, ILLINOIS.

CHECKING SYSTEM AND CHECK THEREFOR.

1,015,573.      Specification of Letters Patent.      Patented Jan. 23, 1912.

Application filed February 20, 1911. Serial No. 609,735.

*To all whom it may concern:*

Be it known that I, CHARLES MALLON, a citizen of the United States, residing at Chicago, in the county of Cook and State of Illinois, have invented certain new and useful Improvements in Checking Systems and Checks Therefor, of which the following is a description.

My invention relates to a checking system and checks therefor, bearing identifying characters, which system is particularly applicable for use in hotels, restaurants, or wherever desired.

The system is particularly adapted in the dispensing of wines or similar articles, in hotels and places where the merchandise passes through different departments and is handled by a number of persons before it is finally disposed of to the consumer, and has among its objects the production of a simple, convenient and efficient checking system of the kind described that will prevent fraud or stealing, as well as mistakes, and at the same time afford an accurate account of the sales and stock on hand.

To this end my invention consists in the novel system and checks therefor herein shown and described, and more particularly pointed out in the claim.

In the drawings, wherein like reference characters indicate like or corresponding parts: Figure 1 is a plan view of the original check, a portion broken away to show the carbon and duplicate below, and Fig. 2 is a plan view of the duplicate check, a portion of the original and carbon turned back.

Referring to the drawings, in which the preferred form of check is shown, applicable for use in hotels for checking the sales of wine, 1 represents the original check, having a space at the top, if desired, for the printing of the name of the hotel, room, etc., or the like, which check bears the designating or identifying character in space 2. The identifying characters or marks may be such as desired, preferably the check is either numbered or lettered consecutively, as for example, the one shown is numbered "A-22", each check bearing different identifying characters or numbers. At a convenient space, as shown below the top space, is provided a designated space 3 for the waiter's identifying mark or number. The check is also provided with a properly designated space 4 for identifying the number of the order check, or that is the number of the order taken by the waiter, as for example, the number of the order check on which he checks or writes his order for the food or wine. A designated space 8 is also provided for the kind or quality, and places or spaces 5, 6 and 7 for the quantity of the goods or liquors dispensed. A space 9 is provided and preferably properly designated for the checker to place his identifying mark, and thereby identifying the checker or person who gives out this check and O. K.s the wine order as the case may be. At some suitable place on the check, as shown at the bottom, is a certificate or a requisition, indicating that the bar tender or man from whom the waiter receives the wine or other merchandise may, upon presenting the original check to the wine room or cellar, exchange the check for the same character and quantity of goods so as to replenish his stock to the extent that it is depleted by the order. It is of course understood that the exact wording of the certificate or requisition may be varied to suit the individual preference of the user of the system.

A duplicate check 11 is provided, having similar designated spaces 12 to 19, similar to the spaces 2 to 9 respectively. Instead of the requisition or certificate, however, the word "duplicate", or its equivalent, is used. This check may be further distinguished, if desired, by changing the color of the paper, or printing, or character of the printing. The order entered upon the original is directly transferred to the duplicate by the usual carbon paper 21, or its equivalent, which may be made separate as shown, or be prepared upon the back of the original check in the well known manner. The two checks, the original and duplicate, may be secured together in any suitable way, or provided, if desired, with perforations and made in a book. The manner of making up a book of originals and duplicates, or forming the two, depends upon the individual preference of the party using the system. Hence I do not wish to be understood as confining myself to any particular way of uniting them.

The system in use or operation may be briefly described as follows: Assuming that the desired number of checks, substantially as described, are issued, for example, to the checker, or to the proper person, and for which he is held directly responsible. The person requiring the same, for example, the waiter, upon receiving or taking the order of the patron, prepares or writes his order check (not shown) as it may be of any style desired, and assuming that a wine order is given, he presents his order check to the checker, who issues a check similar to the one described, bearing its identifying mark or number. Upon this check in the proper designated spaces, the checker marks or writes the waiter's identifying mark or number, together with the number of the order check, and the quantity and quality or kind of wine that is to be dispensed, approving or O. K.ing the check with his own identifying mark, as for example, his signature or initials, or the equivalent, in the space marked 9. He then gives the original check to the waiter, retaining the duplicate, which he promptly sends to the auditor or to the office. The waiter takes the original check, just issued, to the bar tender or party who dispenses the wine to the waiters. The check being properly filled out and O. K.d, or approved by the checker, the wine is delivered to the waiter, the bar tender retaining the check. Then, or at some convenient time, the bar tender presents the check to the wine room or cellar, and receives the same quality and quantity of wine that he has given out to the waiter, as called for by the check, the check being a requisition or order on the wine room. The check is retained by the wine room man and turned in to the auditor, or to the office, accounting for the wine that has been taken from the wine room. The auditor then has in his hands the original check and its duplicate, as well as the waiter's order check. Whenever stock is taken the quality and quantity on hand, together with the checks, show the stock and the consumption and the requirements, and should correspond with the goods on hand when the previous stock was taken and the replenishment to the stock of the wine cellar. It will thus be seen, that the buyer, the wine cellar, the bar tender, the checker and the waiter are all checked, and the auditor is able to prove his accounts. All of the parties being checked in what they receive or dispense, it is impossible for one or any of them to fraudulently obtain goods without the knowledge of the auditor or a record of the same.

The bar tender should have either the stock or his check or requisition, and the wine cellar man must account by turning over his checks or have the stock. The waiter is not able to get wine without the check. Not only is it a check, but the stock of the bar tender is always kept replenished to make up for the goods sold. If there is any discrepancy or loss, it is readily traceable to the party responsible for the same, who may be held to account.

It is of course obvious that while the system is shown and described, and is particularly applicable in handling or dispensing wine or liquors, with immaterial modifications, it may be made applicable for use in handling other lines or kinds of merchandise by slightly varying the wording of a portion or portions of the designated spaces so as to designate other merchandise or information. Hence I do not wish to be understood as limiting myself to the exact form, arrangement, construction or combination of checks shown or described, or uses mentioned.

What I claim as new and desire to secure by Letters Patent is:—

A merchandise check, comprising an original sheet and an auditor's duplicate sheet therefor, said sheets having properly designated spaces for identifying the same, appropriately designated spaces for the salesman's identifying mark, and the salesman's individual check number, identifying the order taken by him, and an appropriately designated space for the checker's identifying character, in combination with properly designated spaces in which to indicate the character and quantity of goods ordered, and a certificate upon the original in the form of a requisition indicating that the proper person receiving the check may, upon presenting the same to the stock room, exchange the check for the same character and quantity of goods to replenish his stock to the extent that it is depleted by said order, and a designating mark upon the duplicate sheet indicating that it is the copy or duplicate of the check issued.

In testimony whereof, I have hereunto signed my name in the presence of two subscribing witnesses.

CHARLES MALLON.

Witnesses:
 Roy W. Hill,
 Charles I. Cobb.